United States Patent [19]
Hines et al.

[11] Patent Number: 5,199,992
[45] Date of Patent: Apr. 6, 1993

[54] APPARATUS FOR THE SINGLE STATION BALANCING AND CORRECTION OF ROTATING WORKPIECES

[75] Inventors: Gordon E. Hines, Ann Arbor, Mich.; Myles Jakubowski, Baxter, Tenn.

[73] Assignee: Hines Industries, Inc., Ann Arbor, Mich.

[21] Appl. No.: 793,134

[22] Filed: Nov. 18, 1991

Related U.S. Application Data

[63] Continuation-in-part of Ser. No. 487,069, Mar. 1, 1990, abandoned.

[51] Int. Cl.⁵ .................... B05C 11/00; B05C 5/00
[52] U.S. Cl. .................................. 118/669; 118/670; 118/680; 118/712; 118/620; 118/321; 427/10; 73/460; 73/462
[58] Field of Search ............... 118/669, 620, 320, 321, 118/680, 670, 712; 427/8, 53.1, 10; 73/66, 460, 462

[56] References Cited

U.S. PATENT DOCUMENTS

| | | |
|---|---|---|
| 2,432,659 | 12/1947 | Criswell . |
| 3,130,075 | 4/1964 | Larsh . |
| 3,996,883 | 12/1976 | Gusarov et al. . |
| 4,083,735 | 4/1978 | Caramanian . |
| 4,645,649 | 2/1987 | Nagao . |
| 4,972,798 | 11/1990 | Ando et al. ............... 118/669 |
| 5,001,408 | 3/1991 | Kyogoku et al. . |
| 5,065,694 | 11/1991 | Earnheart, Jr. ............ 118/669 |
| 5,141,768 | 9/1992 | Ibe et al. .................... 118/670 |

FOREIGN PATENT DOCUMENTS

| | | |
|---|---|---|
| 53-121274 | 10/1978 | Japan . |
| 63-40829 | 2/1988 | Japan . |
| 847107 | 7/1981 | U.S.S.R. . |

Primary Examiner—W. Gary Jones
Assistant Examiner—Todd J. Burns
Attorney, Agent, or Firm—Emch, Schaffer, Schaub & Porcello Co.

[57] ABSTRACT

The invention is a method and a master machine of carrying out the method, for balancing and correct a workpiece at a single station. The correction apparatus is a material applicator and ultraviolet light source which is controlled by a microprocessor to supply metered amounts of viscous material to a workpiece at a desired location to cure an unbalance. The ultraviolet light source cures the viscous material into a solid deposit.

13 Claims, 4 Drawing Sheets

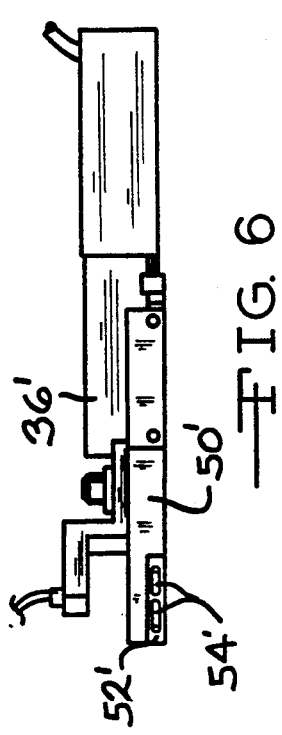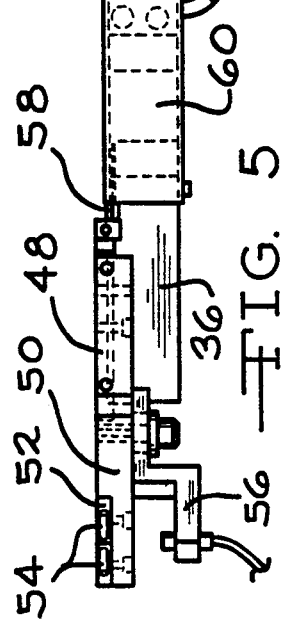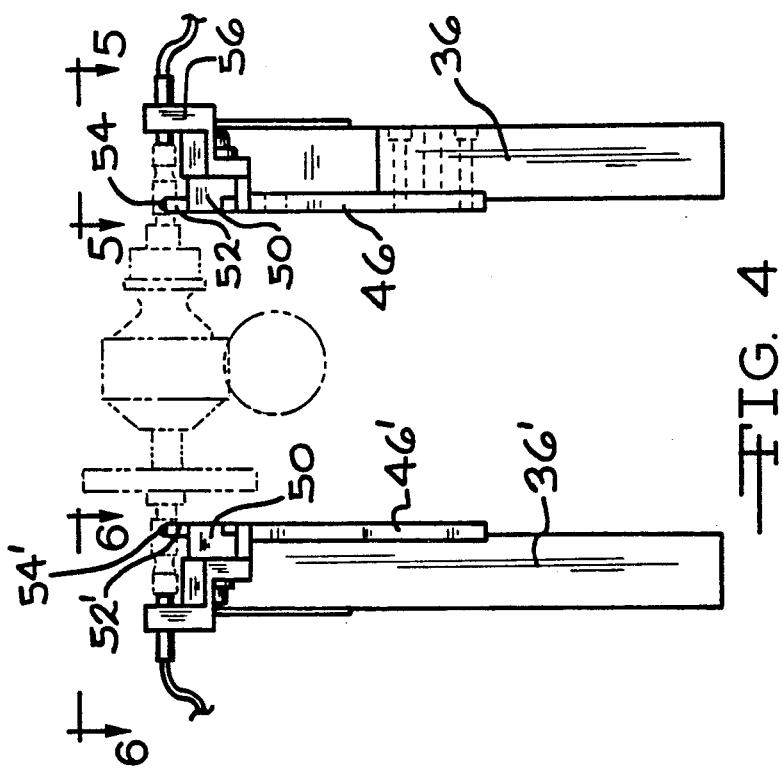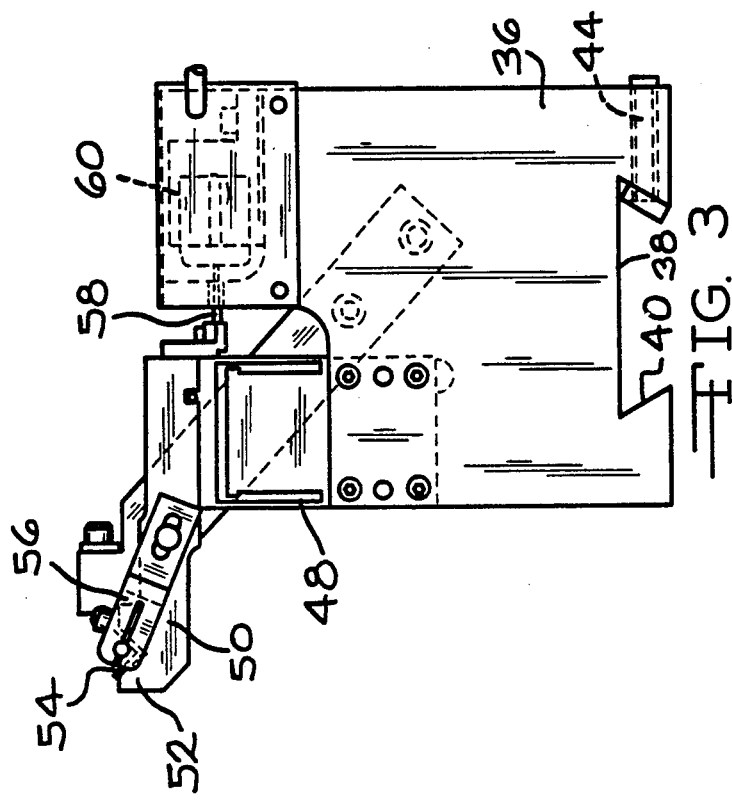

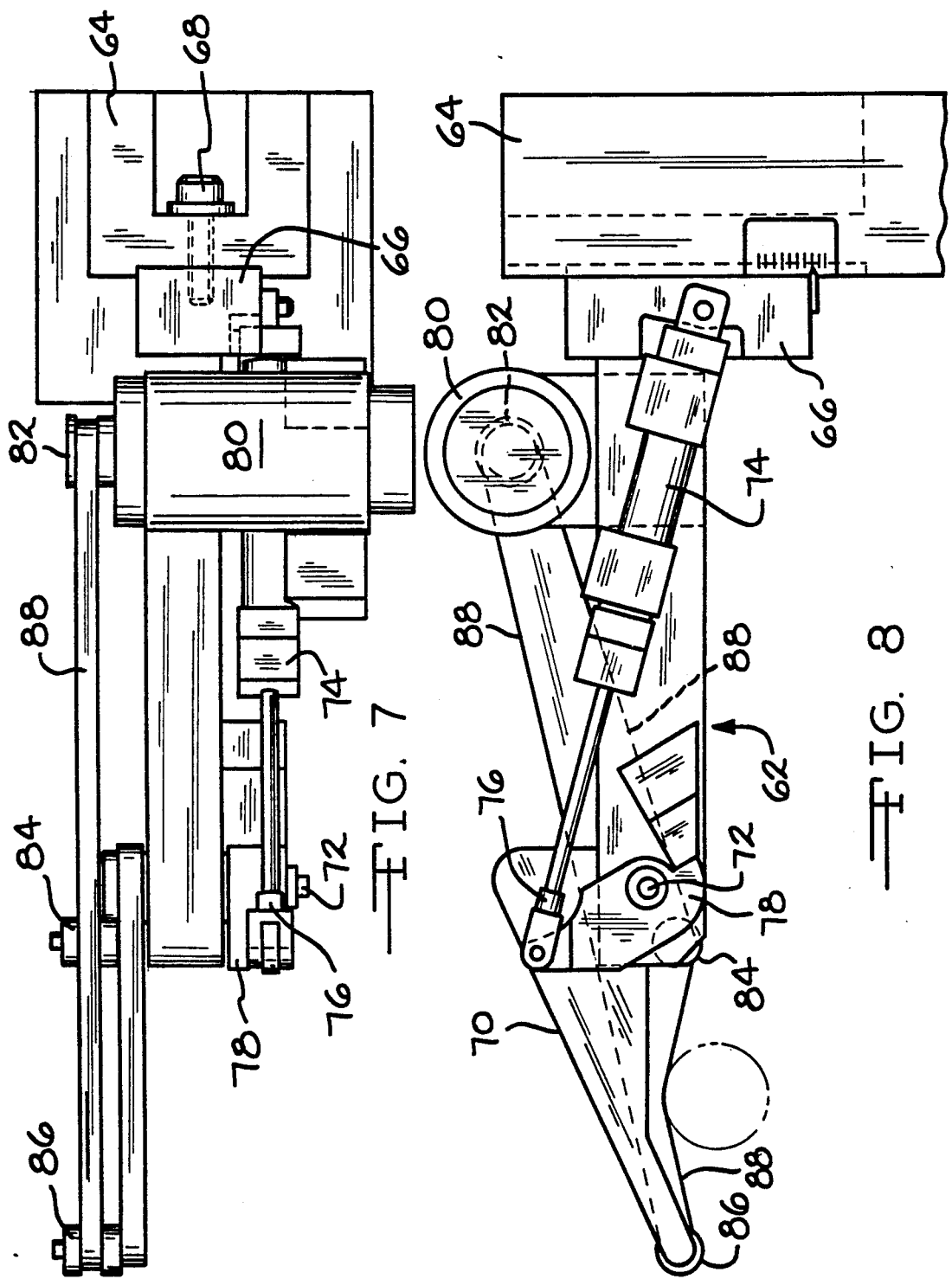

APPARATUS FOR THE SINGLE STATION BALANCING AND CORRECTION OF ROTATING WORKPIECES

BACKGROUND OF THE INVENTION

This application is a continuation-in-part of copending application Ser. No. 07/487,069, filed Mar. 1, 1990 now abandoned. The subject matter of the '069 parent application is hereby incorporated in its entirety.

The present invention provides a method and an apparatus for performing the method of balancing and correcting a rotating workpiece. Specifically, the invention provides a single station for the automatic single and 2-plane balancing and correction of a rotating workpiece such as an armature or rotor. The correction step of the method is achieved through the application of an ultraviolet (UV) cured material in metered amounts to the workpiece. This method of balancing and correction is adaptable to a variety of needs requiring different combinations of automation and manual input.

Common balancing and correction methods currently make use of at least two separate machines; a balancing machine and a material removal machine such as a milling apparatus. The balancing machine and the material removal machine are located proximate each other, for instance in a carousel, and the workpiece is transferred between the machines for balancing, correction and rechecking. Generally the complete balancing cycle involves receiving the workpiece from an infeed conveyor and placing the workpiece on a balancing machine. The amount and angle of unbalance is determined by the balancing machine and the workpiece is indexed to the correct angle. The indexed workpiece is transferred to the material removal machine and a given amount of material is removed from the workpiece at the indexed angle. After the correction step, the workpiece is usually transferred to a second balancing machine or back to the first balancing machine and rechecked. At this point the corrected workpiece is either rejected, recycled, or accepted.

Some workpieces in need of balancing have complex geometric shapes and sizes or have fragile extremities which prevent the accurate use of material removal devices during the correction step. In such instances, material application to correct an unbalance has been attempted. Generally, however, it has been found that the application of material to a rotating workpiece to correct for unbalance is a cumbersome, time-consuming, part stressing procedure. Usually the correction operation takes the form of a manual application of material where the material is applied in a putty form. After the putty is applied to the workpiece, the workpiece is again rotated to recheck the balance. In some cases, the putty does not hold to its point of application and shifts on the workpiece or becomes detached from the workpiece during spinning, thereby deleteriously affecting the correction. Other problems have been encountered with attempts at material application to correct workpiece unbalance. These problems relate to the ability to cure the added material after balancing is achieved. In some cases, a two-part plastic has been used (i.e. one part plastic, the second part a catalyst). This type of catalyzed plastic can take up to 30 seconds to cure. In other instances, the curing of the material may be heat or air activated. Such curing is generally done after the piece has been removed from the balancing machine and can take from 5-30 minutes. Such curing is undesirable in an automated line as it requires further time constraints, workpiece handling and storage, and possibly the heating of the entire part hwich may undesirably stress the part, causing alterations in the balance of the part.

Further, most material application methods involve the manual application of the material to the workpiece. Generally, the methodology involves the measurement of the amount of unbalance; a manual dispensation of a quality of material to correct the unbalance; the placing of the material onto the part by the operator; rechecking of the balance of the part; and if the part is properly balanced, then curing.

There are three major variables that influence the accuracy of the correction achieved when adding material to correct the unbalance of a rotating workpiece: (1) the amount of material applied; (2) distances of correction from the bearing plane to the correction plane; and (3) the distance radially from the centerline of rotation to the location of the placement of the weight addition material. In a weight removal situation the distances are fixed within the tolerances of the lamination stack length and diameter. But in a weight addition situation, the material may be added in regions having non-constant radial distances. For instance, in the case of armature balancing, the material will be added to the wire region which does not have a constant surface: the wire is wound through slots in the lamination thereby creating gaps in the wire surface; wire tension in the winding can vary thereby changing the radial distance of the surface of the coil to the centerline of rotation; and, wire coils overlap thereby changing the height of the individual coils as they enter the lamination slots.

With the increased tolerances for balancing and the statistical process control requirements now being demanded by the balancing industry the previous corrective weight addition methods wherein the material is placed onto the workpiece after calculation of only the angular position of unbalance are no longer viable. Industry demands for higher accuracy require that, if the radial surface varies, the application of correction material at locations of varying radii must account for the impact of the changing radii on the resultant correction.

An object of the present invention is the provision of a master machine that combines the individual stations and machines of a balancing and correction operation into a single station.

Another object of the invention is to provide a master machine in which the indexing of the angular orientation of the part does not have to be maintained or rechecked during transfer of the part from one operation to another.

Another object of the invention is to eliminate all transfer operations between balancing and correction functions.

Another object of the invention is to provide for the automated material application to the workpiece and curing of the material in a time frame which is favorably comparable to correction by milling and other material removal devices.

Yet another object of the invention is to provide for a recorrection of the workpiece without need to transfer the workpiece to another station or recycle the workpiece.

Another object of the invention is to retain memory of the exact index of angular orientation and amount of a first correction in order to determine the proper index and amount for a second correction.

A final object of the invention is to vary the amount of material being applied at a given angular location to correlate with variations in the changing surface to rotational centerline distance.

SUMMARY OF THE INVENTION

The present invention provides a master machine which combines the individual machines of a balancing-correction operation into a single station. A computerized numerical control system regulates the balance measurement, correction and repeat operations. The master machine includes a balance measurement device and a material application device having at least one application member for applying metered amounts of material to the workpiece and an ultraviolet source for curing the material. The application member includes a sensor device designed to monitor surface variations in the workpiece and feed data to the controller for determining the amount of material to be applied at a given location.

The master machine of the present invention is designed to preferably operate in a fully automatic mode with the automatic transfer, balancing and correction operations all controlled by the computerized numerical control system. It is envisioned that variations of the basic invention may be desirable; such as, an automated master machine with manual input and removal of workpieces; a manual feeding of the material application functions to the workpiece where the computer indicates the amount of feed; manual rotation of the workpiece to the properly indexed angle of correction as indicated by the computer; and a manual placement of the drive member on the workpiece to maintain the workpiece in an indexed position during material application operations.

The following description of the preferred embodiment of the invention will present the invention as it is designed to operate in a fully automatic mode. Other variations and combinations will become readily apparent upon review of the drawings and the description of the preferred embodiment.

BRIEF DESCRIPTION OF THE DRAWINGS

FIG. 3 is a side view of the stanchion members as used with the present invention;

FIG. 4 is a front view of the stanchion members as used with the present invention;

FIG. 5 is a sectional view taken along lines 5—5 of FIG. 4;

FIG. 6 is a sectional view taken along lines 6—6 of FIG. 4;

FIG. 7 is a top view of the drive member as used with the present invention; and FIG. 8 is a side view of the drive member as used with the present invention.

DETAILED DESCRIPTION OF THE PREFERRED EMBODIMENT

Figure 1:
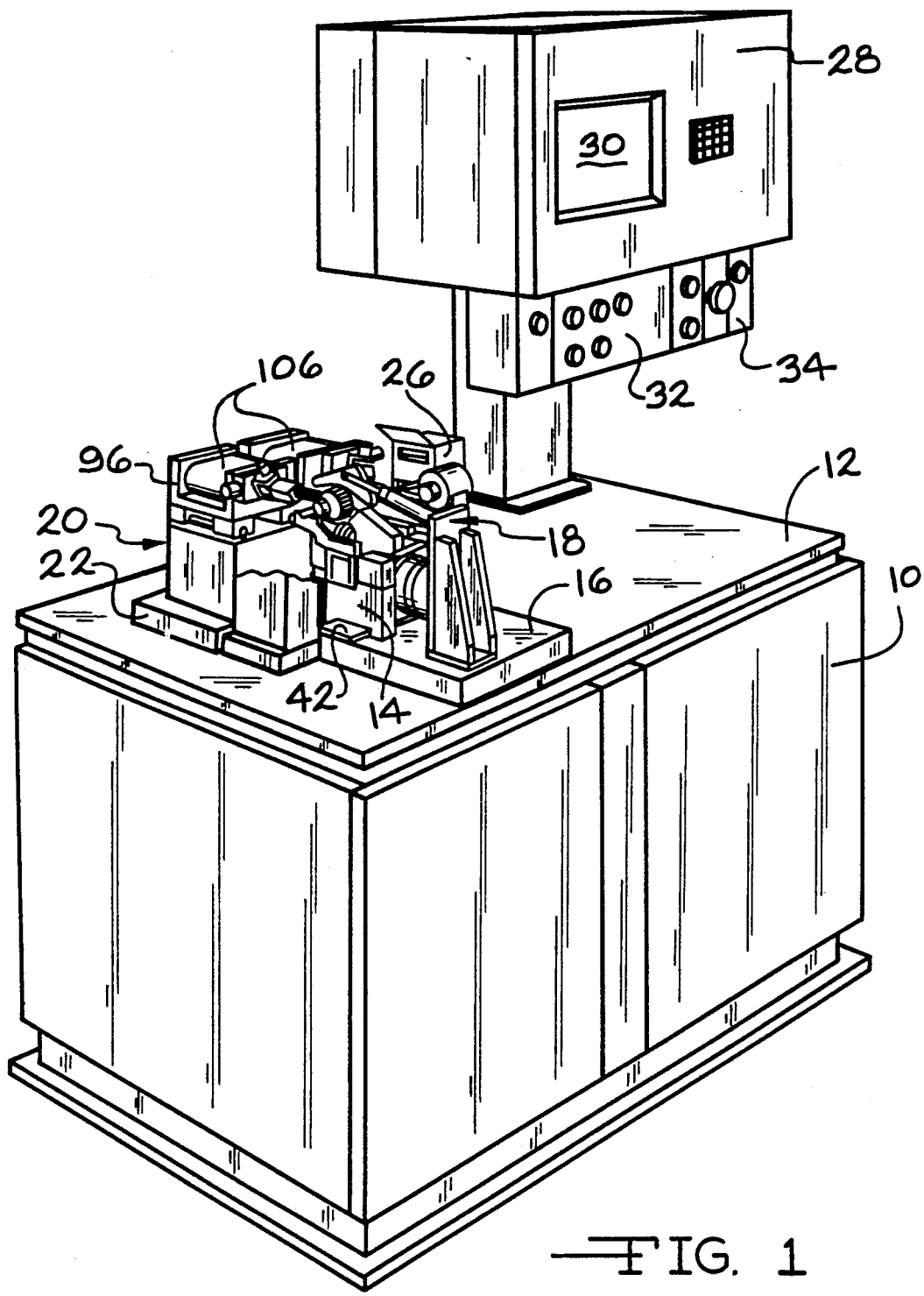
FIG. 1 is an elevated perspective view of the master machine of the present invention.

The fundamental master machine of the present invention is shown in FIG. 1. The master machine includes a base member 10 designed to provide dynamic stability, and a top plate 12 for the mounting of various machine components. Two cantilevered stanchion members 14, 14' for supporting the workpiece during the balancing operation are fixed to a subplate 16 which are in turn fixed to the top plate 12 of the base member 10. A drive member 18 fixed to the top plate 12 adjacent the stanchion members 14, 14' will engage the workpiece and rotate it for the balancing operation. The drive member 18 also indexes the workpiece for the correction operation. The material application device 20 is fixed to a second subplate 22 which is in turn fixed to the top plate 12 adjacent the first subplate 16. The material application device 20 includes at least one applicator member 24 for delivering metered amounts of material and an ultraviolet source 26 for use in curing the material. These various components are uniquely designed to function in a confined and overlapping space, yet allow the flexibility to change tooling and adjust to workpieces of differing sizes and geometries. The control for the tooling and the components of the master machine is supplied by a microprocessor 28 having a CRT display 30, key pad 32 and control panel 34.

The stanchions 14, 14' and sensing device for the balancing and correction apparatus is shown in FIGS. 2-5. A pair of spaced stanchion support members 36, 36' are positioned on the subplate 16 fixed to the top plate 12 of the base member 10. The stanchion support members 36, 36' engage the subplate 16 through a wedge-shaped tongue and groove combination. The female groove 38 has angularly disposed sides 40 designed to engage coinciding angular sides on the tongue 42 which is an integral part of the subplate 16. A set screw 44 fixes the stanchion support members 36, 36' firmly to the tongue 42 of the subplate 16 once their respective positions are accurately achieved. The spacing between the stanchion support members 36, 36' is adjustable and entirely reliant upon the geometry of the workpiece.

A pair of flat suspension members 46, 46' are fixed to the respective support members 36, 36' and are in a free-standing extension beyond each respective support member 36, 36'. Each suspension member 46, 46' has a generally U-shaped slot 48 cut through the flat in a precalculated design, thereby creating a spring member out of the respective suspension member 46, 46'. A pair of cradle arms 50, 50' are fixed to the spring portion of the suspension members 46, 46' and cantilevered away from the support members 36, 36'. Each cradle arm 50, 50' is supported solely with its respective suspension member 46, 46'. A bearing block 52, 52' is located at the cantilevered end of each cradle arm 50, 50'. Each bearing block 52, 52' includes a pair of bearing rods 54, 54' oriented in a V-shape. The shaft of the workpiece rests in the V-shaped bearing rods 54, 54' during the balancing operation. An end stop 56 provides an air cushion to engage the end of the workpiece shaft to prevent the workpiece from traveling during the balancing operation.

A pickup sensor 60, preferably an electronic load cell, is located in each support member 36, 36'. The pickup sensor 60 is in communication with its respective cradle arm 50, 50'. As the cradle arms 50, 50' vibrate due to any unbalance in the workpiece, the pickup sensors 60 detect and measure the amount of vibration.

The over arm drive and indexing member 62 is shown in FIGS. 6-8. A vertical pulley bracket 64 is fixed to the subplate 16 which in turn is fixed to the top plate 12 of the base member 10 between the two stanchion members 14, 14'. The horizontal pulley bracket 66 is mounted for vertical movement on the vertical pulley bracket 64. A set screw 68 is used to lock the horizontal pulley bracket 66 in position on the vertical pulley bracket 64. The horizontal pulley bracket 66 extends between the two stanchion members 14, 14' toward the cradled workpiece. At the opposed end of the horizontal pulley bracket 66 is a pulley bracket 70 which is connected to the horizontal pulley bracket 66 about a pivot 72.

A cylindrical piston member 74 is fixed to the horizontal pulley bracket 66 at a location proximate the vertical pulley bracket 64. The distal end 76 of the piston 74 is attached to a lever member 78 which is, in turn, interconnected to the pulley bracket 70 through the pivot 72. The pulley bracket 70 is rotated by the lever member 78 in response to movement of the cylindrical piston member 74 about the pivot. The cylindrical piston member 74 is operated by any convenient means. In a preferred embodiment, it is driven by pressurized air. As the piston 76 extends and retracts it operates the lever member 78 to rotate the pulley bracket 70 about the pivot 72. A servo motor 80 is also mounted on the horizontal pulley bracket 66 proximate the vertical pulley bracket 64. The servo motor 80 has a pulley 82. A second pulley 84 and a third pulley 86 are located on the pulley bracket 70. A belt 88 is extended around the three pulleys 82, 84, 86. As the motor 80 is driven, the belt 88 is moved along the pulleys 82, 84, 86 and when it is engaging the workpiece, the workpiece is spun on the bearing blocks 52. The drive member 62 is used to spin the workpiece for the balancing operation and for indexing the workpiece for the correction operation through an encoder (not shown).

Figure 2:
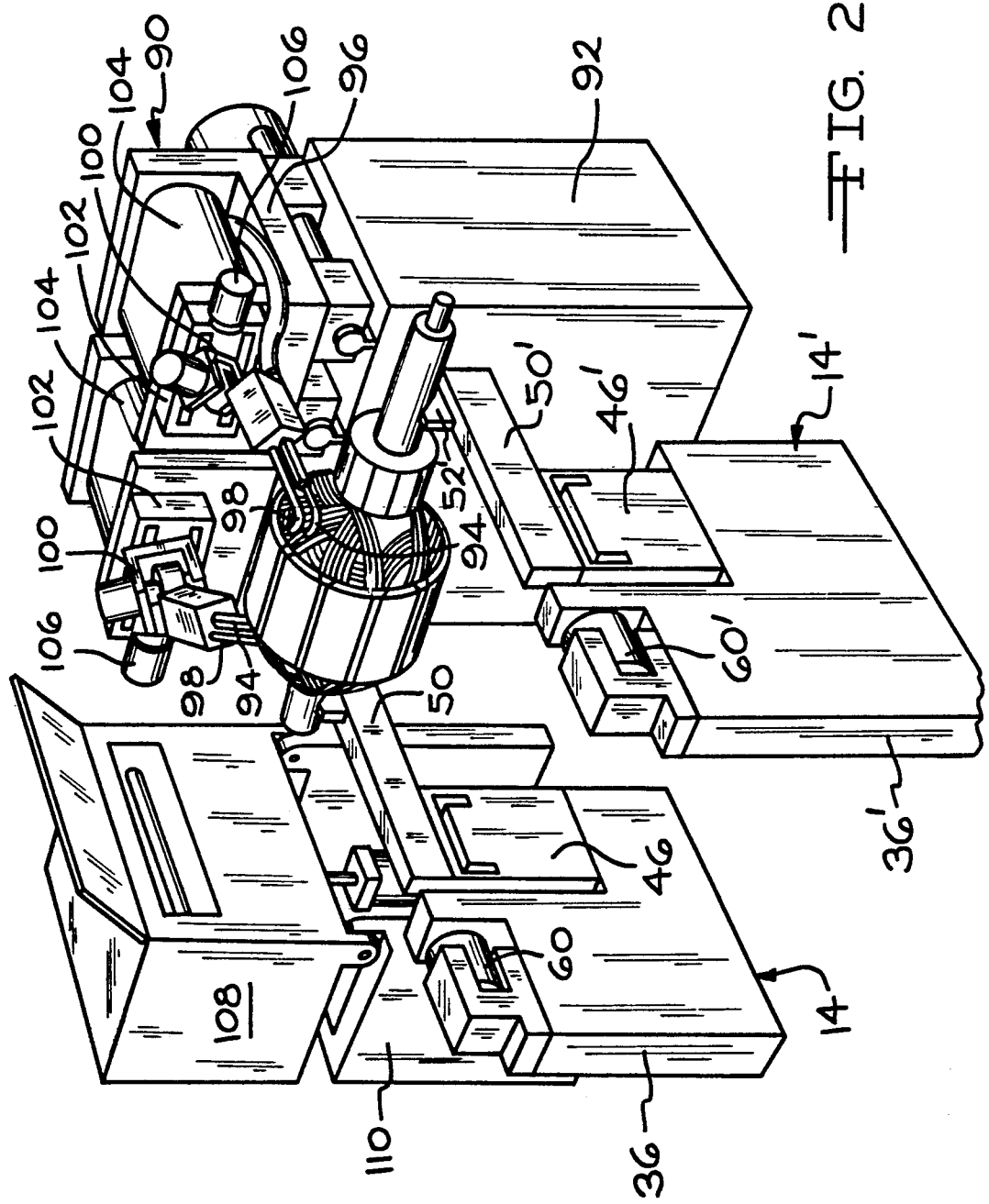
FIG. 2 is a perspective elevated view of the material application device as used with the present invention.

Referring now to FIGS. 1 and 2, the material applicator apparatus 90 is positioned proximate the cradle arm 50 of the stanchion members 14, 14' on the opposed side of the workpiece. The applicator apparatus 90 is mounted on a support member 92 which in turn is fixed to the top plate 12. The applicator apparatus 90 includes at least one and preferably two applicator nozzles 94 positioned on a horizontal slide member 96 which in turn is fixed to the support member 92. The horizontal slide member 96 moves the applicator nozzle 94 into and out of proximate engagement with the workpiece. In the preferred automatic mode, the horizontal slide member 96 is operated by a servo motor which receives and responds to signals from surface probes or sensors 98 which extend in conjunction with the applicator nozzles 94.

The sensors 98 actively search the surface of the workpiece as the correction material is applied and transmit data to the microprocessor 28 to vary the amount of material being dispensed in correlation with the varying surface distances in accordance with the formula $e = Wp/mr$ where $e =$ the distance of the centerline of rotation to the centerline of mass, $Wp =$ the weight of the part, $m =$ the unbalance mass and $r =$ the radius of the unbalance mass from the rotational centerline. The sensor 98 can be of any acceptable type, such as optic, inductant, pneumatic or contact.

The application nozzles 94 are fixed to the horizontal slide member 96 through universal joints 100 which allow the applicator nozzles to be positioned about a wide radius. If desired, a vertical axis slide member 102 can be added to the horizontal slide member 96 to provide greater flexibility in the amount of workpiece surface approachable by the applicator nozzles 94. The material to be applied is contained in a reservoir 104 which is in communication with a pump 106 designed to receive signals from the microprocessor 18 as to the amount and flow rate of the material to the applicator nozzles 94. An ultraviolet light source 108 is positioned proximate the cradle arm 50 for curing the material applied to the workpiece by the applicator nozzles 94. A current embodiment of the invention utilizes two ultraviolet light sources 108 positioned at the opposed ends of the workpiece. The light sources 108 are mounted on a pivoting support bracket 110 to allow the light sources 108 to be focused on the material applied to the workpiece.

The material applicator apparatus 90 utilizes a base material such as polyurethane, epoxy, polyester or a combination of these. The plastic base material has an ultraviolet (UV) activator manufactured by the P. D. George Co. of St. Louis, Mo, added in combination. During the correction operation the microprocessor 28 signals the pump 106 to provide material to the applicator nozzles 94 in a metered amount at a desired flow rate. The plastic material with the UV activator is dispensed through application nozzles 94 in metered amounts in a viscous form. The plastic material, once engaged with the workpiece, is then exposed to the ultraviolet light source 108. The ultraviolet activator in the plastic reacts and sets the plastic. Generally, a three second set time is required. This set time compares favorably with correction by milling or drilling which is generally three to four seconds. The plastic base material with ultraviolet activator may also be utilized, if desired, with an inert filler such as a silicate filler. The material can be applied either as a spot or as a continuous bead. If a continuous bead is deemed desirable, the drive arm 18 will slowly index the part during material application. If a recorrection step is needed, the vertical slide member 102 will adjust to allow the material to be applied to the workpiece at the proper angle but in a different location.

In operation, the present invention performs the following method for balancing rotating parts. An unbalanced or uncorrected workpiece is placed into the bearing blocks 52, 52' of the balancing station. The over arm drive member 18 lowers the belt member 88 into engagement with the uncorrected workpiece resting in the bearing blocks 52, 52'. The motor 80 is activated to drive the belt 88, thereby spinning the uncorrected workpiece. Any vibration from the workpiece from rotation is captured by the load cell 60 which provides electronic signals to the microprocessor 28 regarding the amount and angle of unbalance. If the amount and angle of unbalance is found to be within present tolerance levels, the microprocessor 28 signals that the workpiece can be removed. If the unbalance of the workpiece is outside of a predetermined tolerance, the over arm drive member 18 is signaled by the microprocessor 28 to index the workpiece to a specified location. The over arm drive member 18 stops the workpiece rotation at a correction angle having proper relationship to the material applicator nozzles 94.

The microprocessor 28 signals the drive for the horizontal slide member 96 of the material applicator 90 to place the applicator nozzles 94 in close proximity to the workpiece and will continually transmit data regarding the radial distances of the surface from the rotational centerline to the microprocessor 28 to correlate the material amounts being applied to the workpiece to the radial distance data. The surface probes or sensors 98 will monitor the workpiece surface to maintain the nozzles 94 a desired distance from the surface of the workpiece. IF the workpiece is rotating during material application, the surface probes 98 will also act to track the workpiece surface and maintain the desired distance between the nozzles 94 and the workpiece surface. The microprocessor 28, relying on the data received from the sensors 98, will calculate the proper amount of material to be applied to correct the workpiece and the flow rate of the material based upon information contained in its programming regarding the viscosity and specific gravity of the plastic material and the amount of unbalance in need of correction. The microprocessor 28 then signals the material applicator 90 pumps 106 to apply a metered amount of nonsolid plastic material through the applicator nozzles 94 onto the workpiece. The microprocessor 28 then activates the UV light source 108 to cure or set the plastic material.

Upon completion of the correction operation the over arm drive member 18 is energized to engage the corrected workpiece with the belt 88 and rotate the workpiece a second time. The microprocessor 28 receives the new information relating to the amount and angle of any remaining unbalance and checks the measurement against the preset unbalance tolerance standards for the workpiece. If the workpiece or armature remains out of tolerance a second or further material application step may be required.

The above description of the preferred embodiment and operation of the present invention is intended to be illustrative in nature. It is anticipated that the same methodology and operation may be accomplished using similar apparatus. The above description of the preferred embodiment is not intended to be limiting upon the scope and content of the following claims.

We claim:

1. An improved balancing and correction apparatus for use in achieving the dynamic balance of rotational workpieces comprising, in combination:
   support means for retaining a workpiece in a specified axial orientation during the dynamic rotation of the workpiece;
   drive means positioned proximate said support means for dynamically rotating the workpiece;
   detection means for providing signals relating to the amount and location of any rotational unbalance in the rotating workpiece;
   material application means movable between a position proximate said support means and a position of proximate engagement with the workpiece for depositing viscous material onto the workpiece at a fixed designated location and in a variable amount calculated in response to the signals provided by the detection means;
   sensor means for positioning said material application means into the position of proximate engagement with the workpiece to deposit the viscous material;
   means for curing the viscous material into a solid deposit integrally fixed to the workpiece; and
   controller means for receiving the signals from said detection means and said sensor means, and for calculating the fixed location and the amount of the point of unbalance, and for providing signals to said material application means to position said material application means and apply the viscous material to the workpiece in a variable amount dependent upon the calculations of the amount and location of unbalance and the signals received from said sensor means.

2. The apparatus of claim 1, wherein said drive means rotationally indexes the workpiece to a fixed predesignated location relative to said material application means according to signals produced by said controller means.

3. An improved balancing and correction apparatus for use in achieving the dynamic balance of armature workpieces comprising, in combination:
   two spaced stanchion members, each stanchion member including a V-shaped bearing member, at least one of said bearing members being supported with a spring member and engaged with an electronic pickup for sensing the amount of rotation unbalance in the armature workpiece;
   a drive member positioned adjacent said stanchions for engaging and dynamically rotating the armature workpiece, said drive member including a driven belt member for engaging the armature and means for moving said belt member into and out of engagement with the armature;
   a material application means movable between a position proximate said stanchion members and a position of proximate engagement with the workpiece, said material application means including at least one application nozzle, and reservoir;
   sensor means for positioning said application nozzle into the position of proximate engagement with the workpiece; and,
   controller means in communication with said electronic pickup for processing signals produced by said electronic pickup and calculating the location and amount of the point of unbalance and providing signals related to the calculations.

4. A balancing and correction apparatus for use in achieving the dynamic balance of a rotational workpiece comprising, in combination:
   support means for retaining a workpiece in a specified axial orientation during the dynamic rotation of the workpiece;
   drive means positioned proximate said support means for dynamically rotating the workpiece;
   detection means for providing signals relating to the amount and location of any rotational unbalance in the rotating workpiece;
   material application means movable between a position proximate said support means and a position of proximate engagement with the workpiece for depositing viscous material onto the workpiece at a designated location;
   sensor means for positioning said material application means into the position of proximate engagement with the surface of the workpiece, and for providing signals relating to the radial distance of the surface of the workpiece from the rotational centerline of the workpiece; and,
   controller means for receiving the signals from said detection means and said sensor means, and processing the signals to calculate the location and amount of the point of unbalance and, further, to calculate the amount of viscous material to be applied at the point of unbalance to correct the unbalance and for providing signals to said material application means to position said material application means and apply the viscous material to the workpiece in a variable amount related to the calculations.

5. The apparatus of claim 4 further including means for curing the viscous material into a solid deposit integrally fixed to the workpiece.

6. The apparatus of claim 4, wherein said drive means rotationally indexes the workpiece to a fixed predesignated location relative to said material application means according to the signals produced by said controller means.

7. An improved balancing and correction apparatus for use in achieving the dynamic balance of rotational workpieces comprising, in combination: support means for retaining a workpiece in a specified axial orientation during the dynamic rotation of the workpiece; drive means positioned proximate said support means for dynamically roating the workpiece; detection means for providing signals relating to the amount and location of any rotational unbalance such rotating workpiece; material application means movable between a position proximate said support means and a position of proximate engagement with the workpiece for depositing viscous material onto the workpiece at a fixed designated location and in an amount calculated in response to the signals received by said detection means; sensor means for positioning said material application means into the position of proximate engagement with the workpiece to deposit the viscous material; means for curing the viscous material into a solid deposit integrally fixed to the workpiece; and controller means for receiving signals from said detection means and for calculating the fixed location and the amount of the point of unbalance and for providing signals to said material application means to position said material application means and apply the viscous material to the workpiece in an amount related to the calculations, wherein said drive means rotationally indexes the workpiece to a fixed predesignated location relative to said material application means according to the signals produced by said controller means and said controller means retains in memory the amount and location of any material applied by said material application means.

8. The apparatus of claim 7, wherein said drive means rerotates the corrected workpiece to determine the presence of any remaining unbalance in the workpiece and reindexes the workpiece to a newly determined fixed position, if necessary, based upon signals from said control means relative to the rerotation and the memory retention.

9. An improved balancing and correction apparatus for use in achieving the dynamic balance of rotational workpieces comprising, in combination: support means for retaining a workpiece in a specified axial orientation during the dynamic rotation of the workpiece; drive means positioned proximate said support means for dynamically rotating the workpiece; detection means for providing signals relating to the amount and location of any rotational unbalance in the rotating workpiece; material application means movable between a position proximate said support means and a position of proximate engagement with the workpiece for depositing viscous material onto the workpiece at a fixed designated location and in an amount calculated in response to the signals received by said detection means; sensor means for positioning said material application means into the position of proximate engagement with the workpiece to deposit the viscous material; means for procuring the viscous material into a solid deposit integrally fixed to the workpiece; and controller means for receiving the signals from said detection means and for calculating the fixed location and the amount of the point of unbalance and for providing signals to said materials application means to position said material application means and apply the viscous material to the workpiece in an amount related to the calculations, wherein said drive means rotationally indexes said workpiece to a position designated by said controller means and continues to rotate the workpiece at a slow rotational speed sufficient to allow the viscous material to be applied to the workpiece over a desired distance on the circumference of the workpiece.

10. The apparatus of claim 9, wherein said sensor means maintains the position of proximate engagement with the workpiece during material deposition on the slowly rotating workpiece, the position of proximate engagement being dependent upon the surface contours of the workpiece.

11. A balancing and correction apparatus for use in achieving the dynamic balance of a rotational workpiece comprising, in combination: support means for retaining a workpiece in a specified axial orientation during the dynamic rotation of the workpiece; drive means positioned proximate said support means for dynamically rotating the workpiece; detection means for providing signals relating to the amount and location of any rotational unbalance and the rotating workpiece; material application means movable between a position proximate said support means and a position of proximate engagement with the workpiece for depositing viscous material onto the workpiece at a designated location; sensor means for positioning the material application means into the position of proximate engagement with the surface of the workpiece and for providing signals relating to the radial distance of the surface of the workpiece from the rotational centerline of the workpiece; and, controller means for receiving signals from said detection means and said sensor means and processing the signals to calculate the location and amount of the point of unbalance and, further, to calculate the amount of viscous material to be applied at the point of unbalance to correct the unbalance and for providing signals to said material application means to position said material application means and apply the viscous material to the workpiece in an amount related to the calculations, wherein said drive means rotationally indexes the workpiece to a fixed predesignated location relative to said material application means according to the signals produced by said controller means and said controller means retains in memory the amount and location of any material applied by said material application means.

12. The apparatus of claim 11, wherein said drive means rerotates the corrected workpiece to determine the presence of any remaining unbalance in the workpiece and reindexes the workpiece to a newly determined fixed position, if necessary, based upon signals from said control means relative to the rerotation and the memory retention.

13. A balancing and correction apparatus for use in achieving the dynamic balance of a rotational workpiece comprising in combination: support means for retaining a workpiece in a specified axial rotation during the dynamic rotation of the workpiece; drive means positioned proximate said support means for dynamically rotating the workpiece; detection means for providing signals relating to the amount and location of any rotational unbalance in the rotating workpiece; material application means movable between a position proximate said support means and a position of proximate engagement with the workpiece for depositing viscous material onto the workpiece at a designated location; sensor means for positioning said material application means into the position of proximate engagement with the surface of the workpiece and for providing signals relating to the radial distance of the surface of the workpiece from the rotational centerline of the workpiece; and, controller means for receiving the signals from said detection means and said sensor means and processing these signals to calculate the location and amount of the point of unbalance and, further, to calculate the amount of viscous material to be applied at the point of unbalance to correct the unbalance and for providing signals to said material application means to position said material application means and apply the viscous material to the workpiece in an amount related to the calculations, wherein said drive means rotationally indexes the workpiece to a position designated by said controller means and continues to rotate the workpiece at a slow rotational speed sufficient to allow the viscous material to be applied to the workpiece over a desired distance on the surface of the workpiece.

* * * * *